(12) United States Patent
Eiraku

(10) Patent No.: US 7,000,578 B2
(45) Date of Patent: Feb. 21, 2006

(54) CONTROL APPARATUS FOR VARIABLE VALVE ACTUATION SYSTEM

(75) Inventor: Akira Eiraku, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/973,303

(22) Filed: Oct. 27, 2004

(65) Prior Publication Data
US 2005/0098127 A1 May 12, 2005

(30) Foreign Application Priority Data
Nov. 11, 2003 (JP) .............................. 2003-381536

(51) Int. Cl.
F01L 1/34 (2006.01)
(52) U.S. Cl. .............................. 123/90.15; 123/90.16; 123/90.17
(58) Field of Classification Search ............. 123/90.15, 123/90.16, 9.17, 92.31
See application file for complete search history.

(56) References Cited

U.S. PATENT DOCUMENTS

2002/0166526 A1 * 11/2002 Takahashi et al. ....... 123/90.17

FOREIGN PATENT DOCUMENTS

| JP | 10-184429 | 7/1998 |
| JP | 2002-138865 | 5/2002 |
| JP | 2002-364434 | 12/2002 |

* cited by examiner

Primary Examiner—Thomas Denion
Assistant Examiner—Zelalem Eshete
(74) Attorney, Agent, or Firm—Kenyon & Kenyon

(57) ABSTRACT

An ECU calculates a target working angle r, and determines a difference between the target working angle r and the previous value r' of target working angle as a change rate v to be feedforward controlled. Further, the ECU determines a deviation to be corrected by feedback control from the target working angle r and an actual value that is input from a sensor as a hypothetical rate u. The change rate v and the hypothetical rate u are added together, and a control amount to be output, for example, a voltage E is determined by referring to a three-dimensional map M3 from the added set change rate (v+u) and the input target working angle r.

11 Claims, 7 Drawing Sheets

Fig. 1
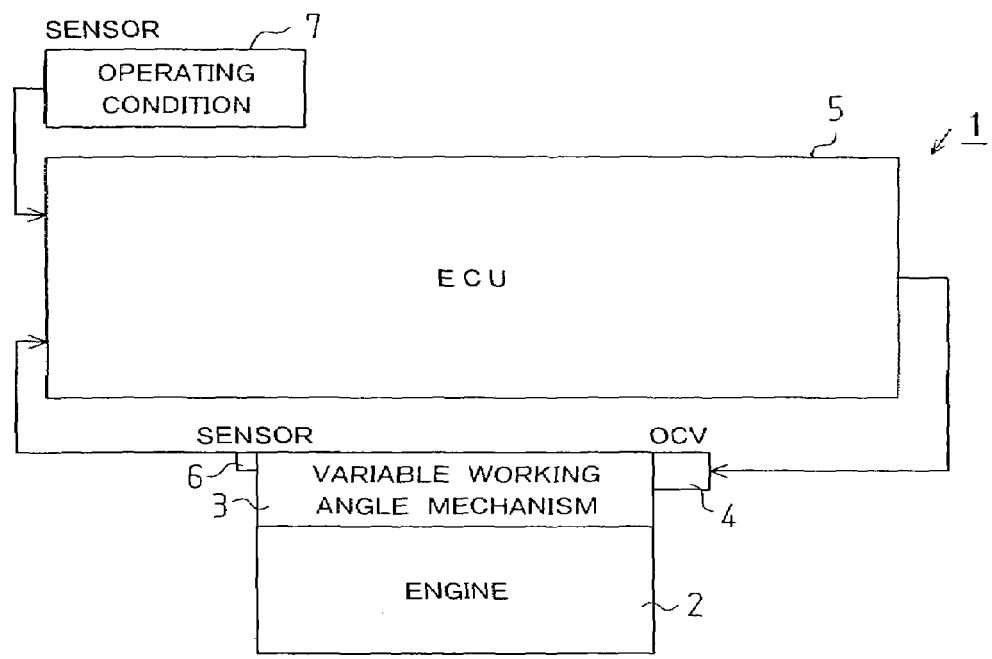
Fig. 2(b) Fig. 2(a)
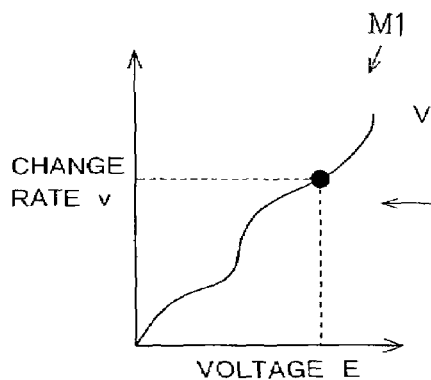 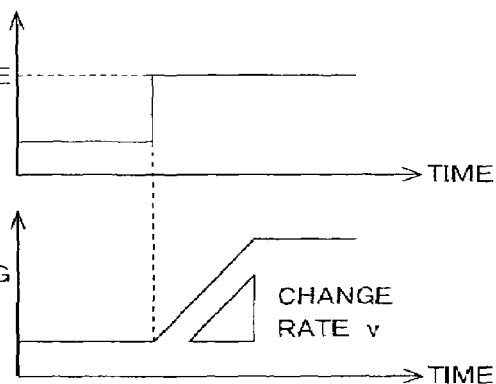

CONTROL APPARATUS FOR VARIABLE VALVE ACTUATION SYSTEM

BACKGROUND OF THE INVENTION

The present invention relates to a control apparatus for a variable valve actuation system for an internal combustion engine.

An automobile engine provided with a variable valve actuation mechanism capable of changing a valve actuation state has been proposed. Changing a valve actuation state refers to changing a quantity of a valve state of an intake valve or an exhaust valve. Specifically, by changing the valve actuation state such as a valve working angle, a valve lift amount, and valve timing in accordance with the operating state of an automobile, the output properties of the engine can be changed. Such a variable valve actuation mechanism is operated by an oil control valve (OCV), a direct-current servomotor, a stepping motor, or a solenoid. Also, the OCV itself is controlled by a direct-current servomotor. Further, a mechanism that directly drives a valve electromagnetically without the use of a cam has also been proposed.

In any case, since the operating state of an automobile changes every moment, the control accuracy of such a variable valve actuation mechanism exerts a great influence on the output properties of an internal combustion engine, and the accuracy of control decreases. The decrease in control accuracy deteriorates the drivability of an automobile and the controllability of air-fuel ratio of the engine.

To increase this accuracy, feedback (FB) control has conventionally been carried out in which the quantity of the valve state, which is position information, is detected, and the detected quantity of the valve state is fed back to correct a deviation of an actual value from a target value.

Also, according to feedforward (FF) control, since the control is carried out by allowing for a change in a control amount in advance, anticipated control is carried out without a delay in control. For example, Patent Document 1 (Japanese Laid-Open Patent Publication No. 2002-364434) discloses control concerning a displacement process from one displacement end to the other displacement end of a valve.

In the conventional feedback control, as shown in FIG. 10(a), a control output is provided in response to a deviation of an actual value (indicated by a broken line) from a target value (indicated by a solid line). However, if the gain of control output is too small, there arises a problem in that the actual value always delays with respect to the target value, which causes a control delay. On the other hand, as shown in FIG. 10(b), if the gain is large, though the response is quick, overshoot may occur, and further the control output oscillates, so that the control becomes unstable. Also, in particular, as shown in FIG. 10(c), for example, if the vehicle speed is different, the control output becomes unstable even if the gain is the same in the case where the response characteristic changes in accordance with the quantity of state. Therefore, a further larger gain cannot be provided. In such a case, it is considered that gain scheduling in which the gain is changed in accordance with control parameters is effective. However, the design method therefor has not been clear. In the graphs of FIGS. 10(a) to 10(c), the abscissas represent time, and the ordinates represent the magnitude of control amount or control output.

Also, a control system may be considered in which a map is prepared in advance and feedback control is carried out together with feedforward control. However, the method for carrying out this control system and the design method therefor are not clear. In particular, the control based on only a deviation of an actual quantity of the valve state from a target quantity of the valve state does not take into account the changing an operating state of an automobile fully enough to the degree that the operating state of the automobile can be responded quickly and accurately. The control method described in Patent Document 1 is control concerning only a displacement process from one displacement end to the other displacement end of a valve, so that this control method cannot solve these problems.

SUMMARY OF THE INVENTION

The present invention has been made to solve the above problems, and accordingly an objective thereof is to provide a control apparatus for a variable valve actuation system, in which control that is stable and has a very short follow-up delay can be carried out easily on a valve.

To achieve the foregoing and other objectives and in accordance with the purpose of the present invention, a control apparatus for a variable valve actuation system for an internal combustion engine is provided. In the engine a quantity of the valve state of at least one valve of an intake valve and an exhaust valve is changed by an actuator. The control apparatus includes calculating means and control amount calculating means. The calculating means calculates a change degree of the quantity of the valve state based on a comparison between a target quantity of the valve state set according to an engine operating state and a target quantity of the valve state set in the past. The control amount calculating means determines an anticipated control amount of said actuator based on said calculated change degree.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a block diagram showing a variable valve actuation system relating to the control apparatus for a variable valve actuation system in accordance with the present invention;

FIG. 2(a) is a graph showing a relationship between voltage E, change rate v of working angle, and time;

FIG. 2(b) is a graph showing a map M1;

DETAILED DESCRIPTION OF THE PREFERRED EMBODIMENTS

Figure 3:
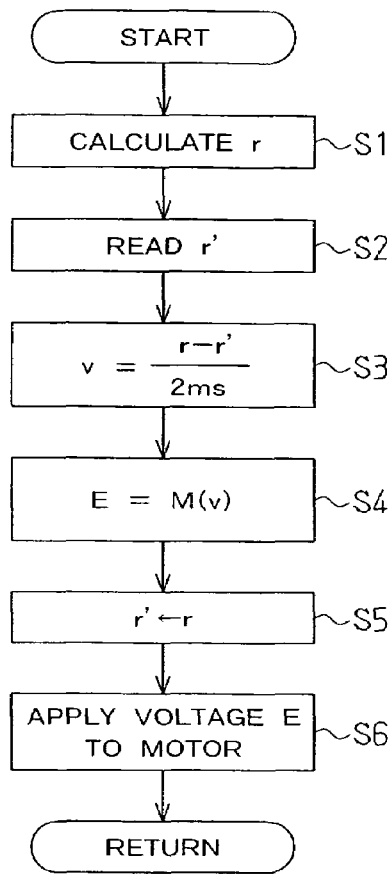
FIG. 3 is a flowchart showing a procedure for control of example 1.

Schematic Configuration of a Variable Valve Actuation System

FIG. 1 is a block diagram showing one example of configuration of a variable valve actuation system to be controlled relating to the control apparatus for a variable valve actuation system in accordance with the present invention. A variable valve actuation system 1 includes an engine 2, a variable valve working angle mechanism 3 mounted on the engine 2, an oil control valve (hereinafter abbreviated to OCV) 4 for operating the variable valve working angle mechanism 3, an ECU (electronic control apparatus) 5 for controlling the OCV 4, and a sensor 6 for sensing a quantity of the valve state, for example, a working angle.

The engine 2 is an internal combustion engine mounted on a vehicle such as a passenger car. The engine 2 is, for example, though not shown in detail, a multi-cylinder gasoline engine of four strokes that is provided with exhaust valves and intake valves driven by rotation of a camshaft, and the engine characteristics are changed by the valve actuation state.

The variable valve working angle mechanism 3 is one example of a variable valve actuation mechanism that changes the valve actuation state to change the characteristics of the engine 2 in accordance with the operating state. The valve actuation state means a profile of the quantity of the valve state such as valve working angle, valve lift amount, valve timing, and the like of an intake valve and an exhaust valve.

The OCV 4 serving as an actuator of this embodiment controls hydraulic oil sent from an oil pressure supply source, i.e., an oil pump driven by rotation of the engine 2 to operate the variable valve working angle mechanism 3 and to thereby change the working angle of an intake or an exhaust valve. The opening/closing of the OCV 4 is controlled by a direct-current motor, for example. Therefore, the driving force of the OCV 4 correlates with the oil pressure, and the oil pressure correlates with the engine speed. For this reason, even if the same voltage is applied to the direct-current motor, if the engine speed differs, the quantity of the valve state such as valve working angle differs. Thereupon, if the voltage applied to the direct-current motor is made proper by referring to the engine speed as a value of operating state, the anticipated control amount for the OCV 4 is set more properly.

The sensor 6 is a sensor for sensing the valve working angle. In the case where the quantity of the valve state other than the valve working angle is used, if the quantity of the valve state is valve timing, a cam angle sensor or a crank angle sensor is needed, and if the quantity of the valve state is a lift amount, a sensor for sensing a lift amount is needed. In this embodiment, though a detailed illustration is omitted, the magnitude of valve working angle is sensed by the working angle sensor 6 provided on the variable valve working angle mechanism 3.

The ECU 5 is a control apparatus including of an engine control circuit formed mainly by a digital computer. The ECU 5 includes a CPU for implementing various calculations and processing and input/output of signals, a ROM for storing data including various control programs and maps, a RAM for temporarily storing data during processing, and an interface for implementing input/output of signals between the CPU and the outside. The ECU 5 functions as various calculating means and maps of the present invention. Also, the control signal sent from the ECU 5 is sent to a driver for the direct-current motor in the OCV 4. This driver is configured so that by applying the voltage according to the control signal to the direct-current motor, the OCV 4 is operated by the direct-current motor.

Also, the ECU 5 receives signals from a sensor 7 for sensing the operating state of the automobile, such as throttle opening degree, engine speed, coolant temperature, oil temperature, intake air temperature, vehicle speed, torque, intake air negative pressure, concentration of oxygen in exhaust gas, intake air amount, fuel injection amount, and shift position. These factors may be used as a value of operating state of the present invention. Besides, the ECU 5 controls a fuel injection system, spark plugs, and the like. Also, signals indicating control modes such as economy mode and power mode (sports mode) are also received by the ECU 5. The ECU 5 carries out engine control in accordance with the selected control mode to control the engine output, and at the same time, sends signals for changing shift up/down timing, damping force of a damper, and the like.

The ECU 5 functions as the control apparatus in accordance with the present invention. The ECU 5 receives a signal relating to the valve working angle from the sensor 6, sends a control signal to the OCV 4, controls the direct-current motor of the OCV 4, and thereby controls the variable valve working angle mechanism 3 by using oil pressure.

This embodiment shows one example of configuration of a system to be controlled by the control apparatus for a variable valve actuation system in accordance with the present invention. For example, the fuel for the engine 2 is not limited to gasoline, and light oil, LPG, LNG, etc. may be used. The number of cylinders may be one or more than one. Also, the number of valves per one cylinder may be two, three, four or more. The engine 2 is not limited to an automobile engine, and may be an engine for other transportation equipment. The present invention may be applied widely to cases where it is desirable to change the engine characteristics in accordance with the driving conditions.

The variable valve actuation mechanism is not limited to the variable valve working angle mechanism shown in the drawings, and may be a mechanism capable of changing a valve lift amount or valve timing if it is capable of changing the valve actuation state. Also, the valve for which the valve working angle is changed may be either or both of the intake valve and exhaust valve.

The variable valve actuation mechanism is operated by a servomotor, a solenoid, or the like in addition to the hydraulic equipment shown in FIG. 1. In the case where the hydraulic equipment is used, the oil pressure is controlled by the OCV 4 as shown in FIG. 1, and the OCV 4 itself is operated by a servomotor, a solenoid, or the like.

The variable valve actuation mechanism of the present invention includes not only a type in which the intake valve and exhaust valve are driven by a cam but also a type in which these valves are driven via a rod or an arm. Further, it may be of a type in which the valve is controlled directly by using an electromagnetic solenoid without the use of a cam.

EXAMPLE 1

Hereunder, example 1 that embodies the control apparatus and method for a variable valve actuation system in accordance with the present invention will be described in detail with reference to the drawings. The variable valve actuation system 1 of example 1 has the ECU 5 as the control apparatus. The ECU 5 changes the working angle of valve in the variable valve actuation system by controlling the voltage supplied to the direct-current motor of the OCV 4.

In the upper graph in FIG. 2(a), the ordinate represents voltage E applied to the direct-current motor of the OCV 4 from the ECU 5, and the abscissa represents elapsed time. In the lower graph in FIG. 2(a), the ordinate represents the magnitude of working angle, and the abscissa represents elapsed time corresponding to the upper graph. FIG. 2(b) shows a map M1 representing the relationship between change rate v, which is a change amount per unit time of valve working angle, and voltage E.

When the voltage E is applied to the direct-current motor of the OCV 4 based on a command from the ECU 5, the OCV 4 is operated by the direct-current motor, and the working angle of valve of the variable valve working angle mechanism 3 is changed. A change in working angle per unit time, for example, 2 ms is referred to as change rate v of working angle. This change rate v of working angle corresponds to a target change rate which is a change degree of the quantity of the valve state.

When a predetermined voltage is applied to the direct-current motor of the OCV 4 in this manner, the change rate v of working angle is determined by a one-to-one relationship. Also, if voltage E is increased, the change rate v increases accordingly. By plotting this relationship, the graph shown in FIG. 2(b) is obtained. The data showing the relationship between voltage E and change rate v is referred to as a map M1. The graph shown in FIG. 2(b) conceptually shows this map M1, and the map M1 is stored in the ROM, which is storage means of the ECU 5, as table data. The voltage E is the anticipated control amount of the present invention.

Although the relationship between voltage E and change rate v is determined by the map M1 in this example, instead, there is a method in which an equation is stored in the ROM to determine the relationship between voltage E and change rate v by calculation. Thus, the voltage E corresponding to the change rate v is determined from an arbitrary change rate v in accordance with the relationship obtained from the map M1 or the equation.

Figure 4:
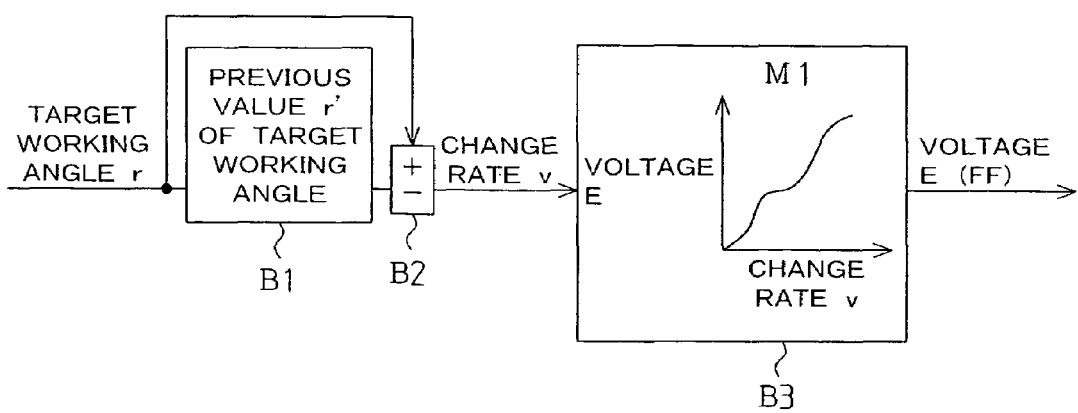
FIG. 4 is a block diagram showing control of example 1.

FIG. 3 is a flowchart showing a procedure for control of example 1. Also, FIG. 4 is a block diagram showing control of example 1. Hereunder, the procedure for control of example 1 will be explained by following the flowchart of FIG. 3 while referring to FIGS. 1, 2 and 4.

First, the ECU 5 calculates a target working angle r based on the data and program stored in the ROM by referring to the throttle opening degree and vehicle speed sent from the sensor 7 (Step (hereinafter abbreviated to S) 1). Succeedingly, the previous value r' of target working angle stored in the RAM is read out (S2). Then, the ECU 5 determines the difference [r–r'] between the target working angle r and the previous value r' of target working angle, and determines the change rate v of working angle per 1 ms by dividing the difference by 2 ms, which is a sampling cycle of working angle, as shown in the following equation, the determined change rate v being made a target change rate (S3).

$$[v=(r-r')/2 \text{ ms}]$$

where v is change rate, r is target working angle, and r' is previous value of target working angle.

The target change rate may be a change amount per fixed unit time regardless of the length of unit time. For example, the change rate per 2 ms of [v=(r–r')] may be used as it is as the target change rate. However, in example 1, [v=(r–r')/2 ms], which is a change rate per 1 ms, corresponds to the target change rate, and corresponds to the change degree of the present invention. The ECU 5 that executes such a procedure corresponds to the calculating means of the present invention.

Control in which the sampling interval for the target working angle r is not fixed may also be carried out. In this case, the difference [r–r'] is divided by the actual sampling time interval to determine a change amount per 1 ms, and this change amount may be made a target change rate.

This procedure corresponds to processing in which the target working angle r is input, and a difference is determined by subtracting the previous value r' of target working angle from the target working angle r in block B2 in FIG. 4.

Next, the value of voltage E corresponding to the change rate v is read out by the following equation by referring to the table data that are stored in the ROM and correspond to the map M1 shown in FIG. 2 (S4).

$$[E=M(v)]$$

where E is voltage, M is map, and v is change rate.

The voltage E is a control amount that is sent to the direct-current motor of the OCV 4, which is the actuator in this example. The ECU 5 executing the processing in S4 corresponds to the control amount calculating means of the present invention. This procedure corresponds to processing in which the voltage E (FF) is output from the change rate v in block B3 in FIG. 4.

Succeedingly, the target working angle r calculated in this routine is rewritten as the previous value r' of target working angle for the processing in the next routine, and stored in the RAM (S5). This procedure corresponds to the following procedure in block B1 in FIG. 4. Specifically, in block B1, when the target working angle is input, this is stored once, and when a next new target working angle r is input, the target working angle r having been stored before is made the previous value r' of target working angle and is output to block B2, and then the new target working angle r is written.

The ECU 5 sends the control signal corresponding to the voltage E calculated in S4 to the driver (not shown) of direct-current motor of the OCV 4. This driver applies the voltage E to the direct-current motor to operate the OCV 4 (S6). Then, this routine ends. When the control transfers to the routine of the next cycle, the target working angle r is calculated again (S1). This processing in S1 is executed 2 ms after the processing in S1 in the previous routine. Therefore, the sampling of the target working angle r is performed at time intervals of 2 ms, and similarly, the control of the ECU 5 on the direct-current motor of the OCV 4 is carried out at time intervals of 2 ms. That is to say, in this example, the target working angle r and the previous value r' of target working angle are data that always have a shift of 2 ms.

Needless to say, unlike the above description, sampling need not necessarily be performed at fixed time intervals. For example, the timing of sampling may be determined in accordance with the rotation of engine.

Figure 9A:
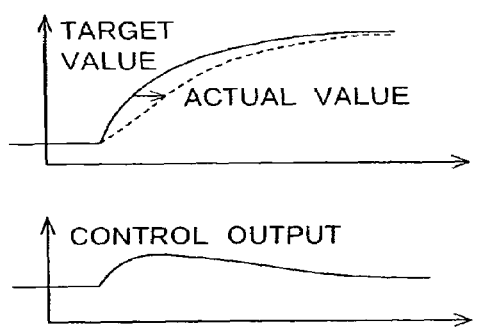
FIG. 9(a) is a graph showing a control state achieved by the conventional control apparatus for a variable valve actuation system.
Figure 9B:
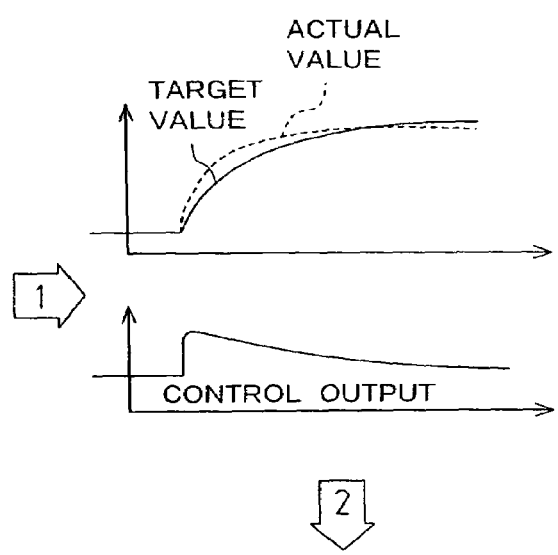
FIGS. 9(b) and 9(c) are graphs showing a control state achieved by the control apparatus for a variable valve actuation system in accordance with the present invention.
Figure 9C:
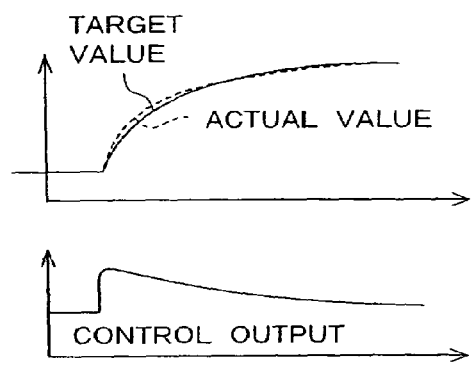
Figure 10A:
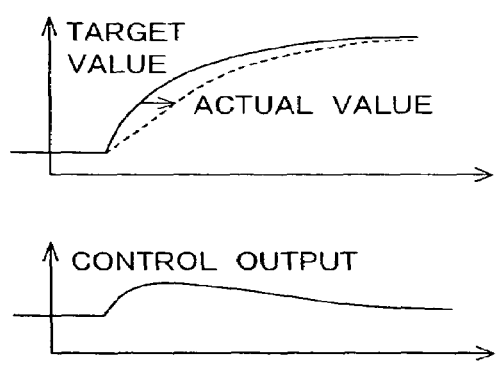
FIGS. 10(a), 10(b) and 10(c) are graphs showing feedback control in the conventional control apparatus for a variable valve actuation system.
Figure 10B:
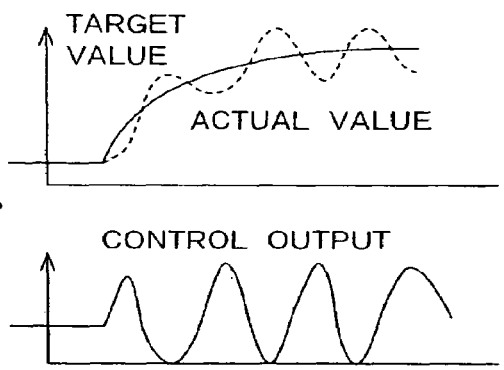
Figure 10C:
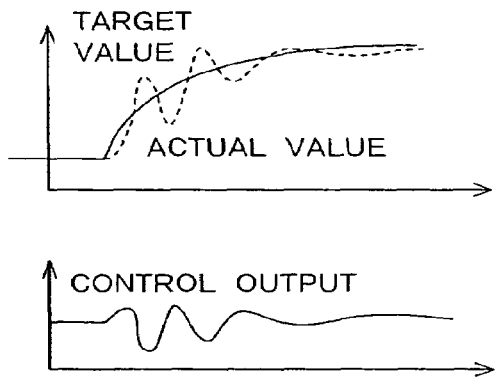

The control apparatus for a variable valve actuation system of example 1 achieves the following advantages:

(1) FIGS. 9(b) and 9(c) are graphs showing the control achieved by the control apparatus for a variable valve actuation system in accordance with the present invention. In the graphs of FIGS. 9(a) to 9(c), the abscissas represent time, and the ordinates represent the magnitude of control amount or control output. Comparing with the conventional FB control shown in FIG. 9(a), a calculation/follow-up delay essentially inherent in the FB control does not occur, or the control amount does not become unstable since anticipated control is carried out by FF control as shown in FIG. 9(b).

(2) Additionally, in example 1, the FF control is not carried out based on the magnitude itself of the target working angle r, but is carried out based on the target change rate, which is determined based on the difference [r–r'] between the target working angle r and the previous value r' of target working angle. Therefore, when the target working angle r changes greatly, the target change rate also increases, so that rapid control is carried out with a larger control amount. Thereupon, when driving conditions change suddenly, rapid control is carried out, so that smooth control matching the operating state is achieved, which improves the drivability and air-fuel ratio controllability.

(3) Further, the voltage E, which is a control amount corresponding to the target change rate, is determined by the map M1, and a proper control amount that has been determined by an experiment in advance may be used. Therefore, smooth control that is further compatible to the operating state is achieved, which further improves the drivability and air-fuel ratio controllability.

EXAMPLE 2

Figure 5:
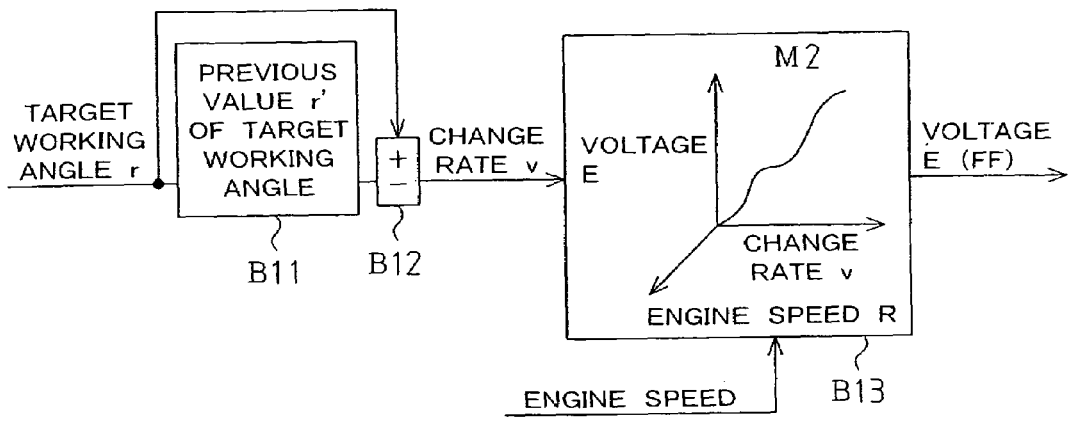
FIG. 5 is a block diagram showing control of example 2.

FIG. 5 is a block diagram showing control of example 2. Hereunder, example 2 will be explained with reference to FIG. 5. The configuration of example 2 is almost the same as the configuration of example 1, but the configuration of map differs from the map M1 of example 1.

In the control apparatus of example 2, a map M2 prepared by determining the relationship between voltage E, change rate v, and engine speed R in advance is stored in the ROM. In addition to the voltage E, which is an anticipated control amount that is output to the OCV 4, and the change rate v, the engine speed R, which is a value of operating condition, is referred to. Therefore, by the storage means that stores the relationship between the anticipated control amount, the quantity of the valve state, and further the value of operating condition as a function or a map, anticipated control better suitable for the operating state is carried out.

In this example, the map M2 showing the relationship between voltage E, change rate v, and engine speed R is stored in the ROM. However, there is a method in which in place of the map M2, an equation for calculating the relationship of these three variables is stored, and the voltage E, which is an anticipated control amount, is determined.

In the map M2 described in example 2, as in the aforementioned map M1, the relationship of change rate v with respect to voltage E is determined by an experiment. By determining this relationship for each engine speed, as shown in block B13 of FIG. 5, a three-dimensional map, in which voltage E and change rate v are chosen as the ordinate and abscissa respectively, and further engine speed R is chosen as an axis perpendicular to these axes, is prepared. The map M2 shown in FIG. 5 is also a conceptual illustration, and actually, this map is stored in the ROM of the ECU 5 as table data.

The procedure for control in this case is the same as that of example 1. Specifically, the target working angle r is input in block B11, and the previous value r' of target working angle is stored. In block B12, the change rate v, which is the target change rate, is determined from the target working angle r, which is the target quantity of the valve state, and the previous value r' of target working angle, which is the previous target quantity of the valve state. In example 1, the voltage E is determined based on only the change rate v from the map M1. On the other hand, in example 2, as shown in FIG. 5, the engine speed R is detected and input from the sensor 7 in block B13 (refer to FIG. 1), and the voltage E is determined based on the change rate v and the engine speed R from the map M2. In this case, the voltage E is determined unequivocally from the change rate v and the engine speed R.

In example 2, the following advantages are achieved in addition to the advantages described in example 1:

(1) In example 2, in addition to the change rate v, the voltage E is determined by referring to the engine speed R. Therefore, smooth control matching the operating state is achieved, which improves the drivability of automobile and the controllability of air-fuel ratio of engine.

(2) In particular, in example 2, when in addition to the change rate v, the voltage E is determined by referring to the engine speed R, the three-dimensional map M2 determined in advance by an experiment is used. That is to say, the driving force that changes the quantity of the valve state by the OCV 4, which is an actuator, correlates with the oil pressure, and the oil pressure correlates with the engine speed R. Therefore, by referring to the engine speed R as the value of operating condition, control is carried out more properly by finely setting the anticipated control amount of actuator based on the change of pressure of oil supplied from the oil pump driven by the engine 2. Therefore, smooth control that is further compatible to the operating state is achieved, which improves the drivability of automobile and the controllability of air-fuel ratio of engine.

This example may be changed as follows:

In example 2, the engine speed R is cited as an example of the value of operating condition. The value of operating condition in this application is a factor that can be expressed by a numeral value and can be used as an index of operating condition. In addition to engine speed, any one or a combination of, for example, load, shaft torque, vehicle speed, acceleration, throttle opening degree or accelerator depression degree, coolant temperature, oil temperature, intake air amount, intake air negative pressure, intake air temperature, fuel injection amount, concentration of oxygen in exhaust gas, and shift position may be cited. Also, control modes such as economy mode and sports mode that are selectively set at the time of driving of automobile are included.

Further, values of valve lift amount, valve timing that indicates an advance angle state or a lag angle state of valve, and the like may be used as the quantity of the valve state. In this case, the optimum quantity of the valve state is selected depending on what type of variable valve actuation mechanism is provided in the engine.

Also, in example 2, only one value of operating condition of engine speed R is cited, and a three-dimensional map is used as the map M2. However, a plurality of values of operating condition may be referred to, and as the map M2, a map of four or more dimensions may be used.

EXAMPLE 3

Next, example 3 that embodies the present invention will be described with reference to FIGS. 6 and 7. In example 3, an element of FB control is added on the basis of FF control of example 1. Basically, the portion of FF control is common to example 1, so that the detailed explanation of the common portion is omitted, and different points are mainly explained.

Figure 6:
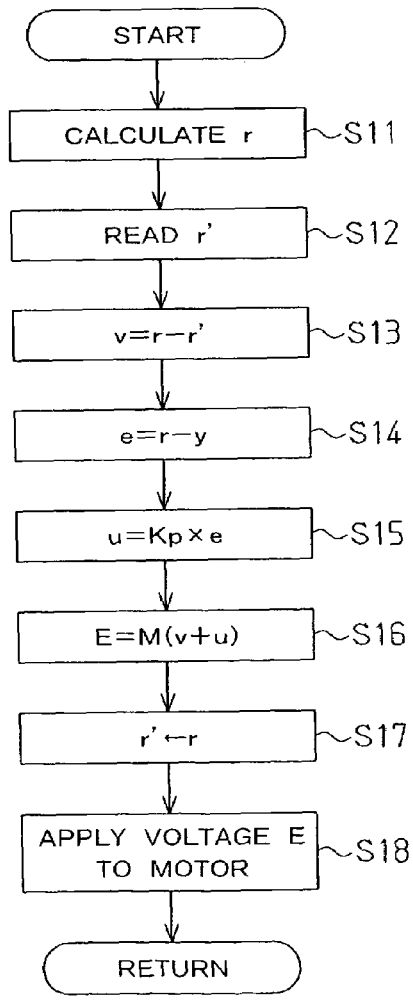
FIG. 6 is a flowchart showing a procedure for control of example 3.
Figure 7:
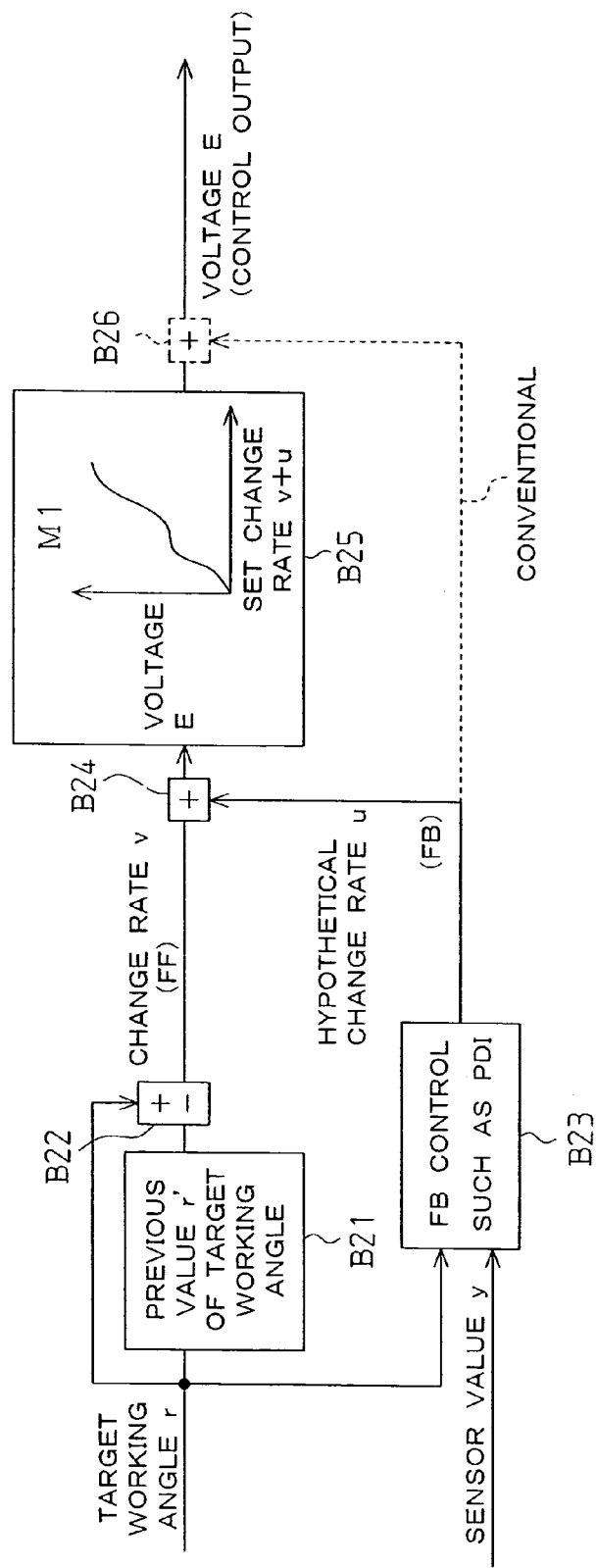
FIG. 7 is a block diagram showing control of example 3.

FIG. 6 is a flowchart showing a procedure for control of example 3, and FIG. 7 is a block diagram showing control of example 3. Hereunder, the procedure for control of example 3 will be explained by following the flowchart of FIG. 6 while referring to FIGS. 1 and 7.

First, the ECU 5 calculates the target working angle r based on the data and program stored in the ROM by referring to the throttle opening degree and vehicle speed sent from the sensor 7 (S11). Succeedingly, the previous value r' of target working angle stored in the RAM is read out (S12). Then, the change rate v is determined by the following equation (S13).

$$[v=r-r']$$

The change rate v is a rate that is to change the working angle, that is, the target change rate. In this example as well, the control cycle is 2 ms, and the target working angle r is sampled every 2 ms. The previous value r' of target working angle is also rewritten every 2 ms. The target change rate is an intermediate value, and may be a change amount per fixed unit time regardless of the length of unit time. Here, the change amount per 2 ms is used as the change rate v. The ECU 5 that executes this procedure corresponds to the calculating means of the preset invention.

Also, this procedure corresponds to processing in which the target working angle r is input, and a difference is determined by subtracting the previous value r' of target working angle from the target working angle r in block B22 in FIG. 7.

On the other hand, as shown in block B23 in FIG. 7, the ECU 5 sends the actual working angle from the sensor 6 as a sensor value y with respect to the target working angle r. Also, the target working angle r is input. From the input target working angle r and sensor value y, a difference between them is determined by the following equation to obtain an intermediate variable e (S14).

$$[e=r-y]$$

Since the intermediate variable e is the difference between the target working angle r and the sensor value y, which is the actual value of working angle at that time, this intermediate variable e is a deviation to be corrected by feedback control inherently by the ECU 5.

Next, the ECU 5 determines a hypothetical working angle rate u by multiplying the intermediate variable e by a feedback gain Kp (S15) by the following equation.

$$[u=Kp \times e]$$

The feedback gain Kp is a factor for proportional control, and inherently is a factor for determining a control amount. In example 3, however, the feedback gain Kp is used to determine the hypothetical working angle rate u to perform processing in the same dimension as the change rate v determined before. Also, this feedback gain Kp is tuned to a fixed value, and is not changed by gain scheduling each time control is carried out. Therefore, the determination of the feedback gain Kp does not cause a control delay, and thus this processing is performed in a very short period of time. The ECU 5 that executes the procedure for determining the hypothetical working angle rate u, which is a hypothetical change rate, corresponds to the hypothetical change rate calculating means of the present invention.

Next, the ECU 5 determines the voltage E by the following equation (S16).

$$[E=M(v+u)]$$

where E is voltage, M is map, v is change rate, and u is hypothetical working angle rate.

First, in block 24, the ECU 5 adds the hypothetical working angle rate u that is output from block B23 in FIG. 7 to the change rate v that is output from block B22, and outputs the value of [v+u] from block B24. This value of [v+u] corresponds to the set change rate of the present invention. The ECU 5 that executes the procedure for adding the hypothetical working angle rate u, which is the hypothetical change rate, to the change rate v, which is the target change rate, corresponds to the set change rate calculating means of the present invention.

In the processing in block B25, the value of voltage E corresponding to [v+u] is read out by referring to the table data corresponding to the map M1 shown in FIG. 2. This voltage E is a control amount that is output to the direct-current motor of the OCV 4, which is the actuator in this example. The ECU 5 that executes the procedure in S4 in which this control amount is determined from the map M1 corresponds to the control amount calculating means of the present invention.

Also, this procedure corresponds to processing for outputting the voltage E (FF) from the change rate [v+u] in block B25 in FIG. 7.

Succeedingly, the ECU 5 rewrites the target working angle r calculated in this routine as the previous value r' of target working angle for the processing in the next routine, and stores it in the RAM (S17). This procedure corresponds to the processing in blocks B21 and B22 in FIG. 7. Specifically, in block B21, the target working angle r is input, and is stored once. When the next new target working angle r is input, the target working angle r held until this time is output to block B22 as the previous value r' of target working angle, and then the input of the new target working angle r is rendered effective. The ECU 5 sends the control signal corresponding to the voltage E calculated in S16 to the driver (not shown) of direct-current motor of the OCV 4. This driver applies the voltage E to the direct-current motor to operate the OCV 4 (S18). Then, this routine ends. When the control transfers to the routine of the next cycle, the target working angle r is calculated again (S11). This processing in S11 is executed 2 ms after the processing in S11 in the previous routine. Therefore, the sampling of the target working angle r for calculation is performed at time intervals of 2 ms, and similarly, the control of the ECU 5 on the direct-current motor of the OCV 4 is carried out at time intervals of 2 ms.

According to the control apparatus for a variable valve actuation system of example 3, the following advantages are obtained:

(1) According to example 3, as shown in FIG. 9(b), the valve working angle is roughly corrected by the FF control of example 1, and further only a small remaining error between the target quantity of state of valve working angle and the actual quantity of state thereof is corrected by FB control. Therefore, as shown in FIG. 9(c), the follow-up delay is small, and stable control is carried out.

(2) In example 3, since the map used in the FF control of example 1 is used and a small residual is obtained without gain tuning (gain scheduling), highly accurate control is carried out easily with a fixed feedback gain.

(3) Furthermore, conventionally, in a "feedforward loop" in which the FF control and FB control are combined, as indicated by a dotted line in FIG. 7, after the finish of FF control, in block B26, FB control has been carried out so that the residual is corrected regardless of FF control. Contrarily, in example 3, the remaining error (r−y) to be subjected to FB control is added to the anticipated quantity of FF control (block B24), and a control amount is determined from the map M1 with respect to one numeral value (v+u) obtained by this addition.

On the other hand, the voltage E and the change rate v exhibit an irregular correlation, for example, as shown in the map M1 in FIG. 7, not a primary linear correlation, because of mechanical situation or difference between individuals of engines or OCVs. Therefore, by making the numeral value as the set change rate (v+u) one, the procedure is made simple. In addition, an advantage is achieved that in this irregular correlation, highly accurate control is carried out as compared with the case where control is carried out by determining control amounts for separate maps and adding them.

EXAMPLE 4

Figure 8:
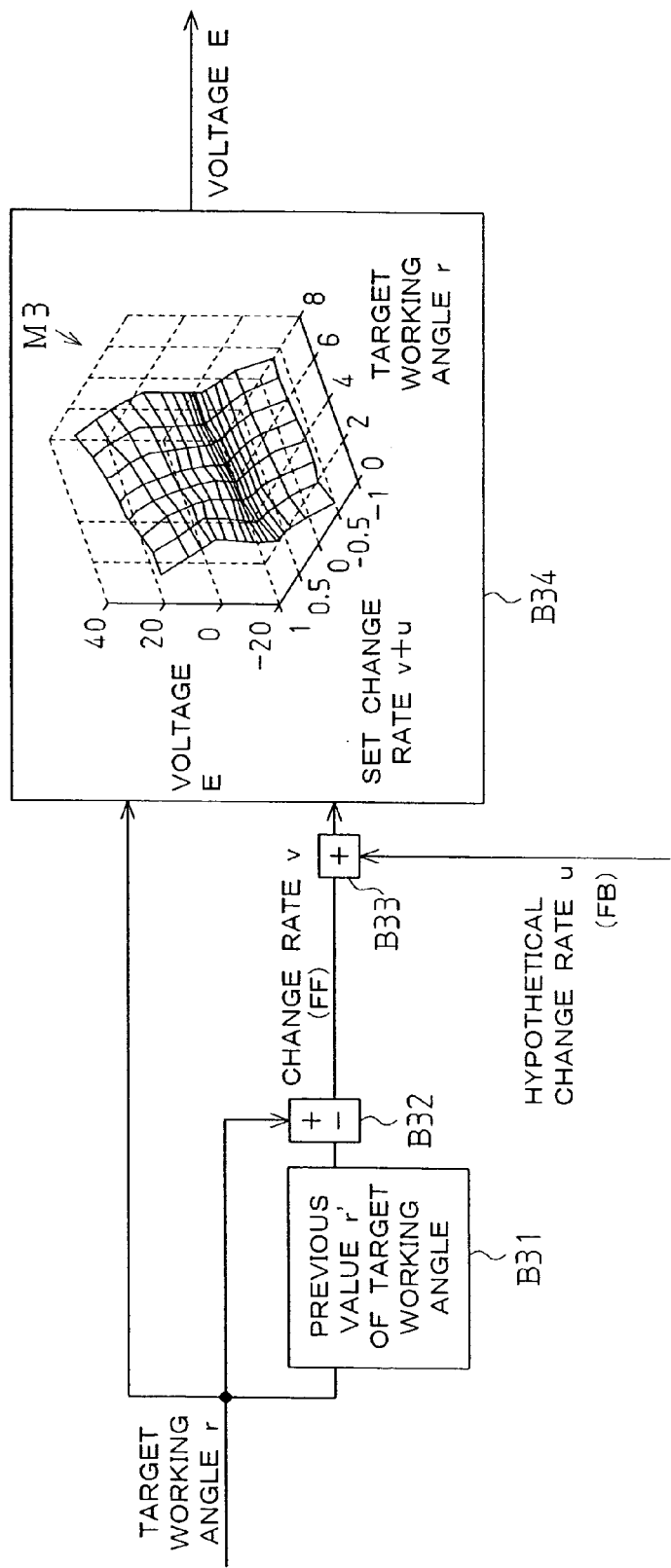
FIG. 8 is a block diagram showing control of example 4.

Next, example 4 that embodies the present invention will be described with reference to FIG. 8. FIG. 8 is a block diagram showing control of example 4. The configuration of example 4 is almost the same as the configuration of example 3, but the configuration of a map M3 of example 4 differs from the map M1 of example 3. The detailed explanation of the same portion is omitted.

The map M3 of example 4 also shows the relationship of the voltage E with respect to the change rate v as in the map M1 of example 3, and is determined by an experiment. This map M3 is shown in block B34 in FIG. 8. In the map M3, the relationship of the voltage E with respect to the set change rate (v+u) is determined for each valve working angle, the map M3 constituting a three-dimensional map. The abscissa of the map M3 represents the set change rate (v+u), the ordinate represents the voltage E, and the axis perpendicular to these axes represents the working angle.

The procedure for control in example 4 is as described below. First, as in example 3, in block B31, the target working angle r is input, and the previous value r' of target working angle is stored. In block B32, the change rate v, which is the target change rate, is determined from the target working angle r, which is the target quantity of the valve state, and the previous value r' of target working angle, which is the previous target quantity of the valve state. Further, the target working angle r is input in block B34.

In example 4, the target working angle r is input in block B31, and the voltage E is determined unequivocally from the map M3 based on the change rate v and the target working angle r.

In example 4, the following advantages are achieved in addition to the advantages described in example 3:

(1) In example 4, the voltage E, which is a control amount, is determined from the map by using not only the change rate v but also the target working angle r, which is the quantity of the valve state as the value of operating condition. Therefore, by referring to the quantity of the valve state itself in controlling the quantity of the valve state, smooth control matching the operating state of automobile is achieved, which improves the drivability and air-fuel ratio controllability.

(2) Also, in example 4, the voltage E is determined by referring to the target working angle r in addition to the change rate v. At this time, the map M3, which is a three-dimensional map determined by an experiment in advance, is used. Therefore, smooth control that is further compatible to the operating state is achieved, which improves the drivability and the air-fuel ratio controllability.

The above-described examples may be changed as follows:

The FB control in examples 3 and 4 indicates only P control (proportional control). Specifically, the deviation e is determined in S14 in FIG. 6, and the hypothetical working angle rate u is determined from the feedback gain Kp in S15. This is for simplification of explanation. Needless to say, the FB control is combined with I control (integral control) and D control (differential control) to make the control a publicly known PID control. In the I control, the intermediate variables e obtained by the past control are integrated for fixed time to determine the sum, and control is carried out by multiplying the sum by a feedback gain Ki. Therefore, a steady-state error is eliminated. Also, in the D control, control is carried out by multiplying the change amount of the deviation e by a gain Kd specified by the user. Therefore, the control amount becomes more stable. In this case, since the change rate v may be deemed to be a differential value of the target working angle r, and the FB control is similar to the D control, PI control, not the PID control, may be used.

In examples 3 and 4, the maps M1 and M3 are prepared by determining the relationship between the change rate v, the voltage E, and the engine speed R or the target working angle r by an experiment in advance and storing it. In this case, it is preferable that the relationship of a map be learnt by utilizing the result of feedback.

Each of the flowcharts shows one example of procedure of the present invention, and does not restrict the sequence of processing, and also may include other processing.

Although the OCV 4 is driven by the direct-current servomotor in the above-described examples, the driving means is not limited to the direct-current servomotor, and the OCV 4 may be driven by any driving means such as a solenoid or a stepping motor. In this case, the control amount is not limited to the voltage E, and current, duty ratio, number of pulses, or the like that controls the driving means may be used as a control amount.

The actuator for the variable valve actuation system 1 is not limited to the OCV 4 as in the examples. A direct-current servomotor, a solenoid, a stepping motor, and the like may be used as the actuator. In this case, the control amount is not limited to voltage, and current, duty ratio, number of pulses, or the like that controls the actuator may be used as a control amount.

As the intake valve or the exhaust valve, there is known a valve of a type in which the valve is not driven by a cam, but is directly driven and controlled based on the electromagnetic force of an electromagnet of a valve driving device. If the state before the quantity of the valve state is changed is a normal state, in the normal state, the valve is driven by the valve driving device. In this case, changing the operating characteristics by changing the quantity of the valve state is to change the normal driving state by the valve driving device itself. At this time, the valve driving device itself performs the function of actuator of the present invention.

Also, when the valve is driven by an element other than the cam, other driving sources other than the electromagnet, such as a linear motor or a hydraulic system, may be used.

What is claimed is:

1. A control apparatus for a variable valve actuation system for an internal combustion engine, in which engine a quantity of a valve state of at least one valve of an intake valve and an exhaust valve is changed by an actuator, comprising:

calculating means for calculating a change degree of the quantity of the valve state based on a comparison between a target quantity of the valve state set according to an engine operating state and a target quantity of the valve state set in the past; and control amount calculating means for determining an anticipated control amount of said actuator based on said calculated change degree.

2. The control apparatus for a variable valve actuation system according to claim 1, wherein said change degree is a target change rate indicating a change amount per time in the target quantity of the valve state.

3. The control apparatus for a variable valve actuation system according to claim 1, wherein said control amount calculating means determines said anticipated control amount by referring to a value of the engine operating state, which is a numerical value representing the engine operating state.

4. The control apparatus for a variable valve actuation system according to claim 3, wherein said value of operating condition is said quantity of the valve state.

5. The control apparatus for a variable valve actuation system according to claim 3, wherein said actuator is an oil control valve for controlling the pressure of oil supplied from an oil pressure supply source driven by said internal combustion engine, and the quantity of the valve state of said valve is changed by operating said oil control valve; and said value of operating condition is an engine speed.

6. The control apparatus for a variable valve actuation system according to claim 1, wherein said control apparatus further comprises storage means, wherein a relationship between an anticipated control amount which is output to said actuator and a change rate of the corresponding quantity of the valve state or the value of the engine operating state, which is a numerical value indicating the engine operating state in addition to the change rate, is determined in advance, and said relationship is stored in said storage means; and wherein said control amount calculating means determines said anticipated control amount based on said relationship stored in said storage means.

7. The control apparatus for a variable valve actuation system according to claim 6, wherein said relationship stored in said storage means is expressed by a map.

8. The control apparatus for a variable valve actuation system according to claim 1, wherein said control apparatus further comprises:

detecting means for detecting an actual quantity of the valve state;

hypothetical change rate calculating means for calculating a hypothetical change rate of the quantity of the valve state based on the target quantity of the valve state and said actual quantity of the valve state; and set change rate calculating means for calculating a set change rate of the quantity of the valve state by referring to the hypothetical change rate and said target change rate, wherein said control amount calculating means further determines an anticipated control amount which is output to said actuator by referring to said set change rate.

9. The control apparatus for a variable valve actuation system according to claim 2, wherein said control amount calculating means determines said anticipated control amount by referring to a value of the engine operating state, which is a numerical value representing the engine operating state.

10. The control apparatus for a variable valve actuation system according to claim 4, wherein said actuator is an oil control valve for controlling the pressure of oil supplied from an oil pressure supply source driven by said internal combustion engine, and the quantity of the valve state of said valve is changed by operating said oil control valve; and said value of operating condition is an engine speed.

11. A method for controlling a variable valve actuation system for an internal combustion engine, in which engine a quantity of a valve state of at least one valve of an intake valve and an exhaust valve is changed by an actuator, comprising:

calculating a change degree of the quantity of the valve state based on a comparison between a target quantity of the valve state set according to an engine operating state and a target quantity of the valve state set in the past; and determining an anticipated control amount of said actuator based on said calculated change degree.

* * * * *